(12) United States Patent
Koneru et al.

(10) Patent No.: US 11,416,261 B2
(45) Date of Patent: Aug. 16, 2022

(54) GROUP LOAD REGISTER OF A GRAPH STREAMING PROCESSOR

(71) Applicant: Blaize, Inc., El Dorado Hills, CA (US)

(72) Inventors: Satyaki Koneru, Folsom, CA (US); Kamaraj Thangam, Hyderabad (IN); Sruthikesh Surineni, Folsom, CA (US)

(73) Assignee: Blaize, Inc., El Dorado Hills, CA (US)

( * ) Notice: Subject to any disclaimer, the term of this patent is extended or adjusted under 35 U.S.C. 154(b) by 125 days.

(21) Appl. No.: 16/930,192

(22) Filed: Jul. 15, 2020

(65) Prior Publication Data

US 2021/0042127 A1 Feb. 11, 2021

Related U.S. Application Data

(63) Continuation-in-part of application No. 16/535,309, filed on Aug. 8, 2019.

(51) Int. Cl.
*G06F 9/30* (2018.01)
*G06F 9/38* (2018.01)

(52) U.S. Cl.
CPC .......... *G06F 9/3887* (2013.01); *G06F 9/3001* (2013.01); *G06F 9/30036* (2013.01); *G06F 9/30043* (2013.01); *G06F 9/30098* (2013.01); *G06F 9/30149* (2013.01); *G06F 9/3877* (2013.01)

(58) Field of Classification Search
CPC ............... G06F 9/3887; G06F 9/30036; G06F 9/30098; G06F 9/3001
See application file for complete search history.

(56) References Cited

U.S. PATENT DOCUMENTS

| | | | |
|---|---|---|---|
| 5,796,645 A | 8/1998 | Peh et al. | |
| 5,930,160 A | 7/1999 | Mahant-Shetti | |
| 6,298,366 B1 | 10/2001 | Gatherer et al. | |
| 6,904,446 B2 | 6/2005 | Dibrino | |
| 2005/0033944 A1* | 2/2005 | Wadleigh | G06F 9/3887 712/221 |
| 2009/0100122 A1 | 4/2009 | Zheng et al. | |
| 2010/0274990 A1* | 10/2010 | Wilder | G06F 9/3001 712/22 |
| 2012/0221830 A1* | 8/2012 | Faanes | G06F 15/8053 712/7 |
| 2018/0341495 A1* | 11/2018 | Culurciello | G06N 3/04 |
| 2020/0293867 A1* | 9/2020 | Shao | G06N 3/08 |

* cited by examiner

*Primary Examiner* — Jyoti Mehta
*Assistant Examiner* — Kasim Alli
(74) *Attorney, Agent, or Firm* — Brian R. Short (57) ABSTRACT

Methods, systems and apparatuses for graph streaming processing are disclosed. One method includes loading, by a group load register, a subset of a an input tensor from a data cache, wherein the group load register provides the subset of the input tensor to all of a plurality of processors, loading, by a plurality of weight data registers, a plurality of weights of a weight tensor, wherein each of the weight data registers provide an weight to a single of the plurality of processors, and performing, by the plurality of processors, a SOMAC (Sum-Of-Multiply-Accumulate) instruction, including simultaneously determining, by each of the plurality of processors, an instruction size of the SOMAC instruction, wherein the instruction size indicates a number of iterations that the SOMAC instruction is to be executed and is equal to a number of outputs within a subset of a plurality of output tensors.

17 Claims, 10 Drawing Sheets

Loading, by a group load register, a subset inputs of an input tensor from a data cache, wherein the group load register provides the subset of inputs of the input tensor to all of a plurality of processors
510

Loading, by a plurality of weight data registers, a subset of weights of a weight tensor, wherein each of the weight data registers provide a weight to a single of the plurality of processors
520

Performing, by the plurality of processors, a SOMAC (Sum-Of-Multiply-Accumulate) instruction
530

Simultaneously determining, by each of the plurality of processors, an instruction size of the SOMAC instruction, wherein the instruction size indicates a number of iterations that the SOMAC instruction is to be executed and is equal to a number of outputs within a subset of an output tensor
540

DPAC-4 (SOMAC with 4 terms) operation for instruction size=8

(instruction size sets the number of iterations)

destination_operand_iteration0 = source_operand1(4 terms) * source_operand2_iteration0(4 terms) + destination_operand_iteration0 destination_operand_iteration1 = source_operand1(4 terms) * source_operand2_iteration1(4 terms) + destination_operand_iteration1 destination_operand_iteration2 = source_operand1(4 terms) * source_operand2_iteration2(4 terms) + destination_operand_iteration2

~~destination_operand_iteration3 = source_operand1(4 terms) * source_operand2_iteration3(4 terms) + destination_operand_iteration3~~ [skip because source_operand2_iteration3 terms are zero]

destination_operand_iteration4 = source_operand1(4 terms) * source_operand2_iteration4(4 terms) + destination_operand_iteration4

~~destination_operand_iteration5 = source_operand1(4 terms) * source_operand2_iteration5(4 terms) + destination_operand_iteration5~~ [skip because source_operand2_iteration5 terms are zero]

destination_operand_iteration6 = source_operand1(4 terms) * source_operand2_iteration6(4 terms) + destination_operand_iteration6 destination_operand_iteration7 = source_operand1(4 terms) * source_operand2_iteration7(4 terms) + destination_operand_iteration7

4 terms needed for operand1 since the same 4 terms are used in each iteration.

A total of 4x8=32 terms are needed for operand2 since each iteration uses a different set of 4 terms.

FIGURE 10

GROUP LOAD REGISTER OF A GRAPH STREAMING PROCESSOR

RELATED APPLICATIONS

This patent application is a continuation-in-part (CIP) of U.S. patent application Ser. No. 16/535,309, filed Aug. 8, 2019, which is herein incorporated by reference.

FIELD OF THE EMBODIMENTS

The described embodiments relate generally to graph stream processing. More particularly, the described embodiments relate to methods, apparatuses and systems for group load register of a graph streaming processor.

BACKGROUND

Neural networks are made up of a series of layers where each layer has multiple inputs and multiple outputs. Each input and output is a two-dimensional feature map. Each input is connected to and contributes to each output in weighted fashion. The compute pipeline has operations which are fundamentally a multiply-accumulate (MAC). A MAC involves multiplying two source operands and accumulating the result into the destination operand. Variations of the MAC operations are used extensively in neural networks, including dot-product-accumulate and convolve-accumulate. The two source operands and the destination operand need to be read from the register file and fed into the compute pipeline. The operation is performed and the result accumulated into the destination and written back.

It is desirable to have a method, apparatus and system for a group load register of a graph streaming processor.

SUMMARY

One embodiment includes a graph streaming processor. The graph streaming processor includes a data cache, the data cache comprising an input, weight, and output tensors, a plurality of processors, and a group load register. The group load register is operative to load a subset of inputs of the input tensor, wherein the group load register provides the subset of the inputs of the input tensor to all of the plurality of processor. A plurality of weight data registers is operative to load a subset of weights of the weight tensor, wherein each of the plurality of weight data registers provide a weight to a single of the plurality of processors. The plurality of processors operative to perform a SOMAC (Sum-Of-Multiply-Accumulate) instruction, including each of the plurality of processors simultaneously operating to determine an instruction size of the SOMAC instruction, wherein the instruction size indicates a number of iterations that the SOMAC instruction is to be executed and is equal to a number of outputs within a subset of a plurality of outputs of the output tensor.

Another embodiment includes a method of graph streaming processing. The method includes loading, by a group load register, a subset of inputs of an input tensor from a data cache, wherein the group load register provides the subset of the inputs of the input tensor to all of a plurality of processors, loading, by a plurality of weight data registers, a subset of weights of a weight tensor, wherein each of the weight data registers provide an input to a single of the plurality of processors, and performing, by the plurality of processors, a SOMAC (Sum-Of-Multiply-Accumulate) instruction, including simultaneously determining, by each of the plurality of processors, an instruction size of the SOMAC instruction, wherein the instruction size indicates a number of iterations that the SOMAC instruction is to be executed and is equal to a number of outputs within a subset of the output tensor.

Other aspects and advantages of the described embodiments will become apparent from the following detailed description, taken in conjunction with the accompanying drawings, illustrating by way of example the principles of the described embodiments.

DETAILED DESCRIPTION

The described embodiments are embodied in methods, apparatuses and systems for a hardware architecture that supports SIMD (single input, multiple data) processing of an input tensor that includes a group load register, resulting in a output tensor.

Figure 1:
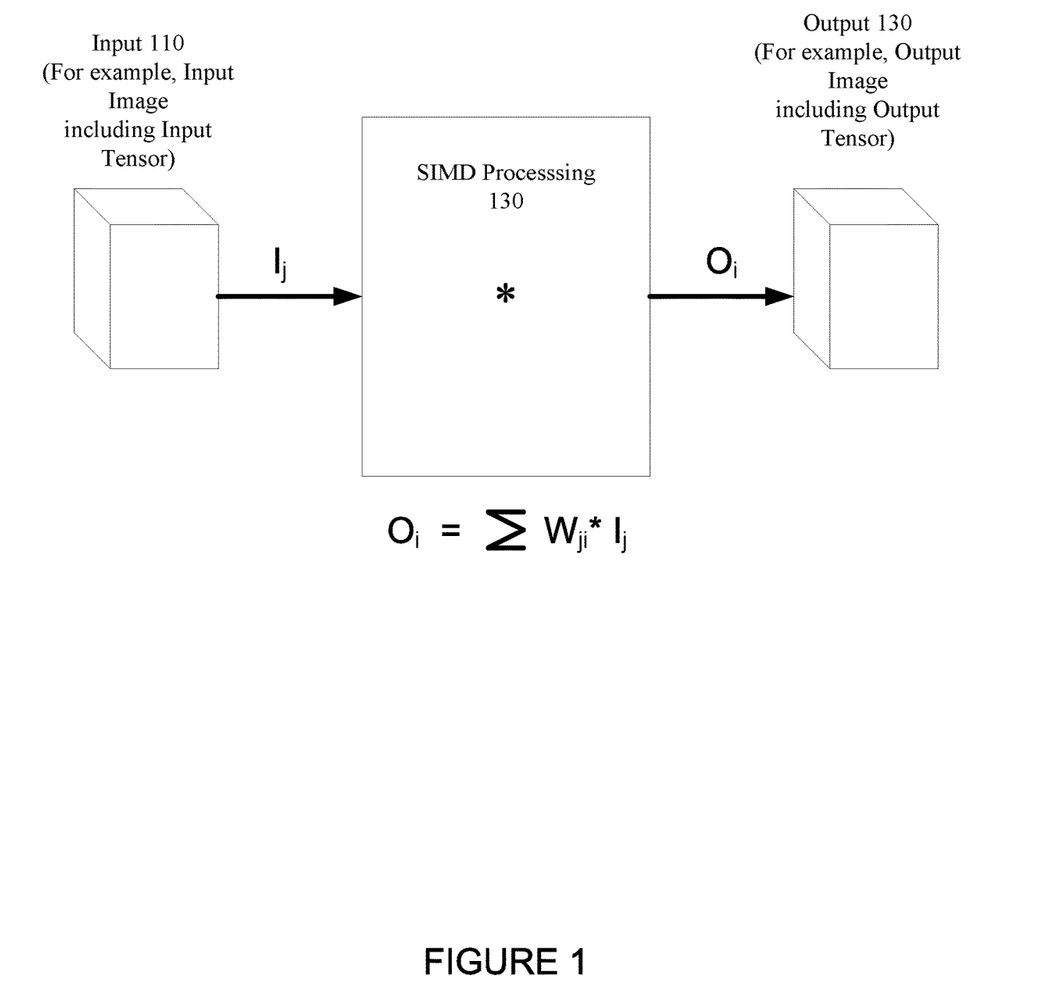
FIG. 1 shows SIMD (single input, multiple data) processing of an input tensor, resulting in an output tensor, according to an embodiment.

FIG. 1 shows SIMD (single input, multiple data) processing of an input tensor, resulting in an output tensor, according to an embodiment. The input 110 includes N-1 dimension of the N-dimensional input tensor $I_j$ and the output 130 includes N-1 dimension of the N-dimensional output tensor $O_i$. For an embodiment, the 3D input tensor $I_j$ is, for example, an array of 2D input images and the 3D output tensor $O_i$ is, for example, an array of 2D output images. SIMD processing 140 performs operations on the input tensor $I_j$ and generates the output tensor $O_i$.

For an embodiment, the SIMD processing 140 includes a SOMAC (Sum-Of-Multiply-Accumulate) instruction that performs, for example, a convolution of the subset of inputs of the input tensor $I_j$ with the subset of weights of a weight tensor $W_{ji}$. The SOMAC operation is represented in FIG. 1 as $O_i = \Sigma W_{ji} * I_j$.

For an embodiment, the 3D output tensor $O_i$ 130 generated by the SIMD processing also includes an array of 2D images.

Figure 2:
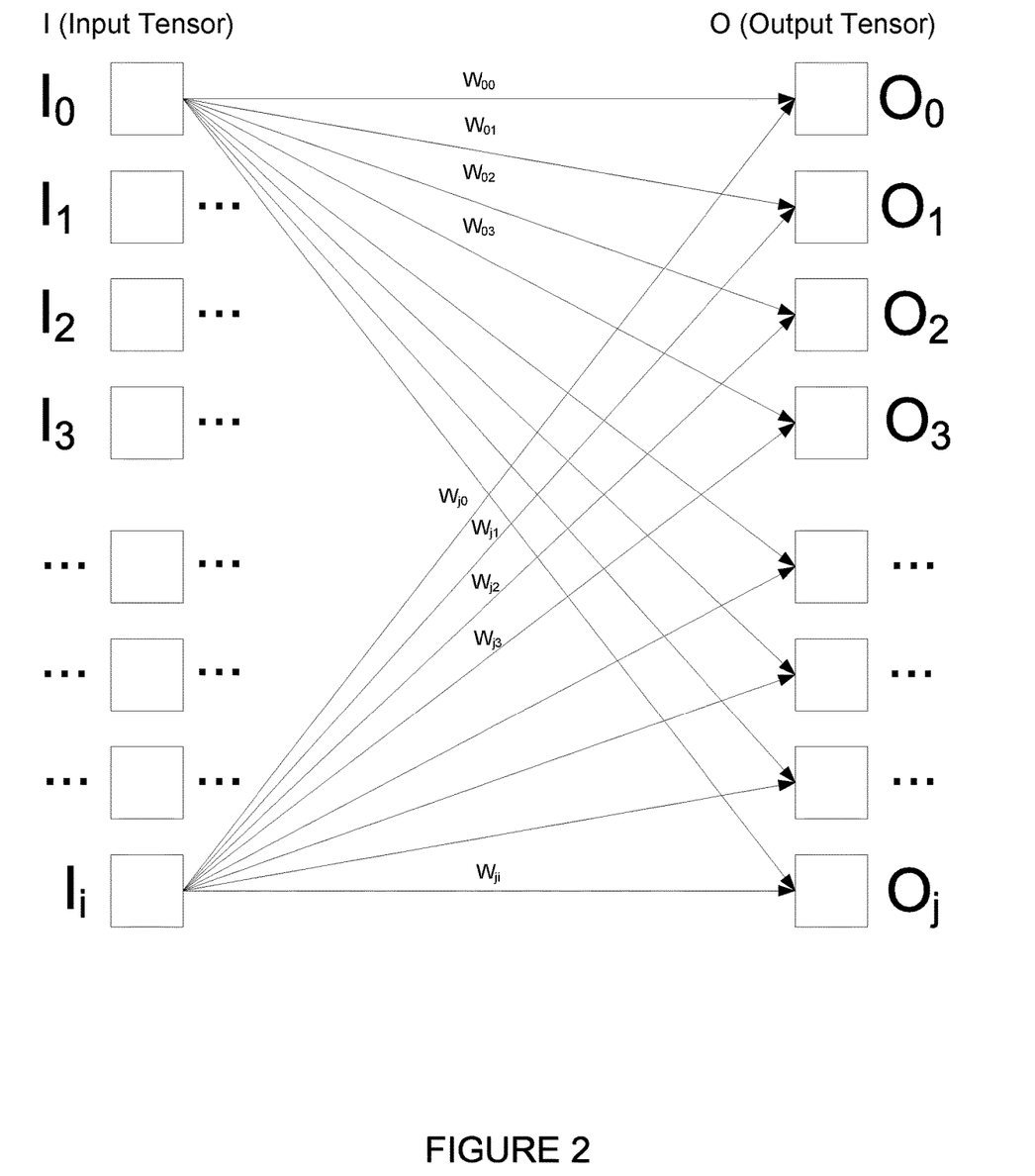
FIG. 2 show another representation of SIMD (single input, multiple data) processing of an input tensor, resulting in an output tensor, according to an embodiment.

FIG. 2 show another representation of SIMD (single input, multiple data) processing of an input tensor, resulting in an output tensor, according to an embodiment. As shown, the SIMD processing includes generating an output O of the output tensor $O_i$ based on all the inputs $I_j$ of the input tensor I and corresponding weights of the weight tensor $W_{ij}$.

Figure 3:
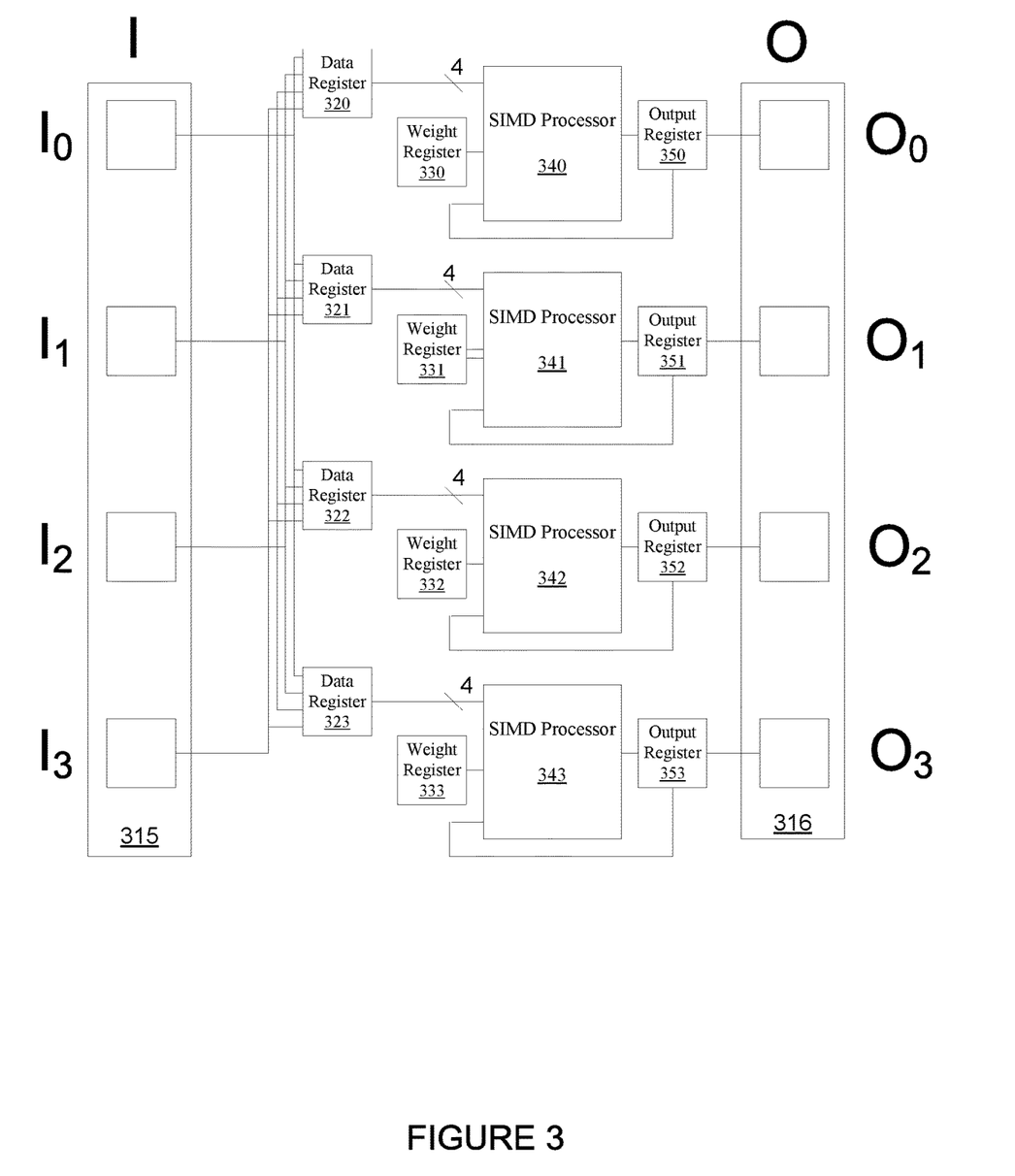
FIG. 3 shows a hardware architecture that provides SIMD (single input, multiple data) processing of an input tensor, resulting in an output tensor, according to an embodiment.

FIG. 3 shows a hardware architecture that provides SIMD (single input, multiple data) processing of an input tensor $I_j$, resulting in an output tensor $O_i$, according to an embodiment. As shown, data cache 315 includes the input tensors $I_j$, and data cache 316 includes the output tensor $O_i$. Further, the data cache (not shown) includes the weight tensor. While shown as separate cache 315, 316, for an embodiment, the cache 315, 316 are the same or common cache.

FIG. 3 shows only the first four inputs of the input tensor ($I_0, I_1, I_2, I_3$), but as described, there can be any number of $I_j$ inputs. Further, FIG. 3 only shows four outputs of the output tensor ($O_0, O_1, O_2, O_3$), but as described, there can be any number of outputs $O_i$. Further, any number of weights of the weight tensor $W_{ji}$ may be utilized.

As shown, the inputs ($I_0, I_1, I_2, I_3$) are each loaded input data registers 320, 321, 322, 323. Further, as shown, weights $W_{ji}$, are loaded into weight registers 330, 331, 332, 333. Through the input data registers 320, 321, 322, 323 and the weight registers 330, 331, 332, 333 the inputs ($I_0, I_1, I_2, I_3$) and the weights $W_{ji}$ are provided to a plurality (as shown, four) SIMD processors 340, 341, 342, 343 which perform a SOMAC instruction on the inputs ($I_0, I_1, I_2, I_3$) and the weights $W_{ji}$, yielding outputs ($O_0, O_1, O_2, O_3$) which are stored in output registers 350, 351, 352, 353.

As will be shown and described, for at least some embodiments, the SIMD processing of the SIMD processors 340, 341, 342, 343 includes a dot-product-accumulate operation, or a convolve multiple and accumulate operation which can also be referred to as a Sum-Of-Multiply-Accumulate (SOMAC).

Figure 4:
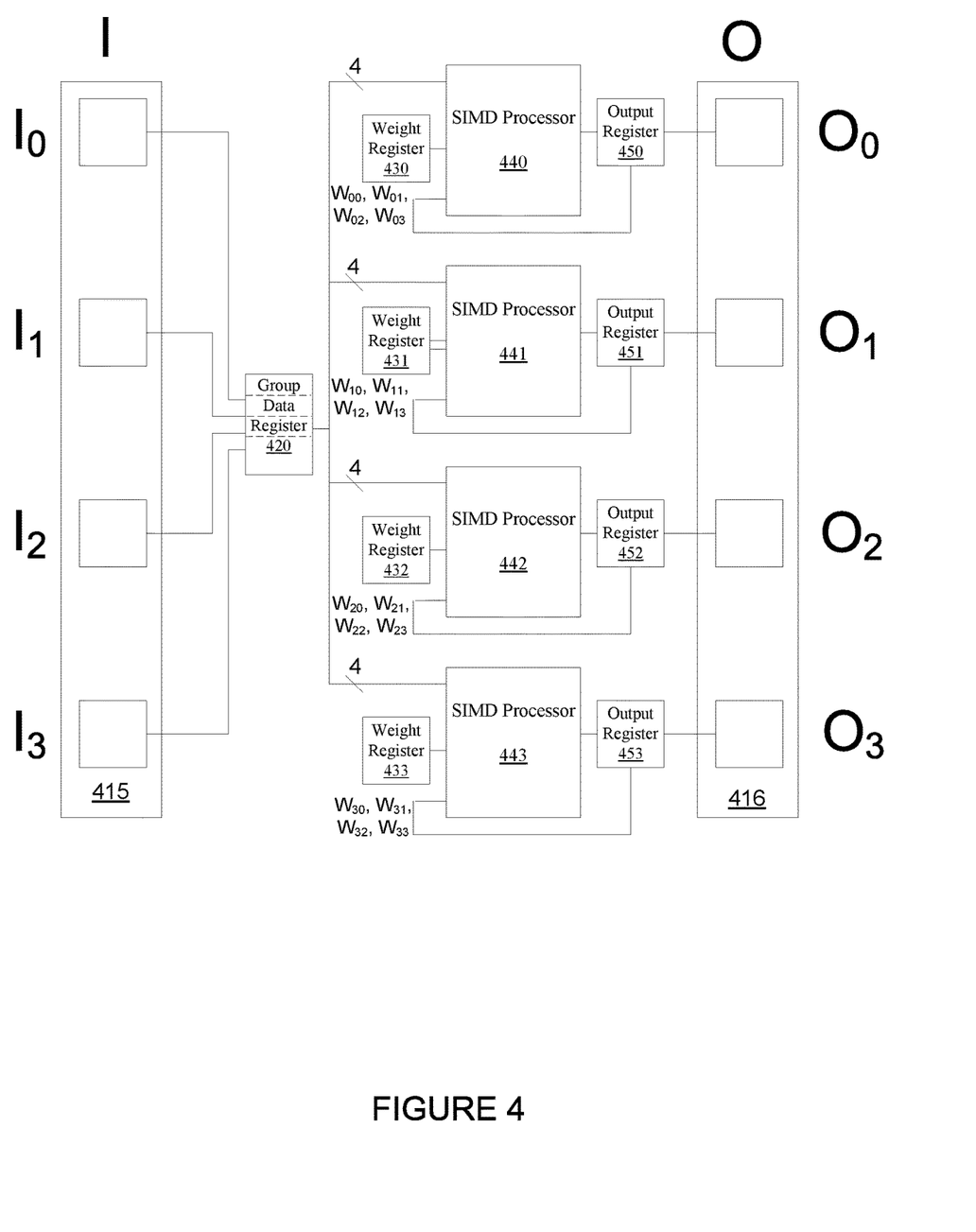
FIG. 4 shows a hardware architecture that provides SIMD (single input, multiple data) processing of an input tensor that includes a group load register, resulting in an output tensor, according to an embodiment.

FIG. 4 shows a hardware architecture that provides SIMD (single input, multiple data) processing of an input tensor that includes a group load register 420, resulting in an output tensor, according to an embodiment. As can be observed in FIG. 3, if the data registers 320, 321, 322, 323 all have the same set of inputs ($I_0, I_1, I_2, I_3$) loaded into them, then as shown in FIG. 4, a group load register 420 may be utilized, which reduces the number of registers used. Utilizing the group load register 420 over the data registers 320, 321, 322, 323 enables improving the compute-to-bandwidth ratio and as a result reduces the amount of circuitry which reduces power consumption, space, and cost.

As shown in FIG. 4, the hardware architecture provides a graph streaming processor that includes a data cache 415, 416. The data cache 415 is used for the inputs ($I_0, I_1, I_2, I_3$). The data cache 416 is used for outputs ($O_0, O_1, O_2, O_3$) generated by the graph streaming processing.

Further, the graph streaming processor includes a plurality of processors 440, 441, 442, 443.

For an embodiment, the group load register 420 operate to load a subset of inputs ($I_0, I_1, I_2, I_3$) of the input tensor wherein the group load register 420 provides the subset of inputs ($I_0, I_1, I_2, I_3$) of the input tensor to all of the plurality of processors 440, 441, 442, 443.

For an embodiment, a plurality of weight data registers 430, 431, 432, 433 operate to load a subset of the weights of the weight tensor $W_{ji}$, wherein each of the plurality of weight data registers 430, 431, 432, 433 provides an input to a single of the plurality of processors 440, 441, 442, 443. For example, weights $W_{00}, W_{01}, W_{02}, W_{03}$ may be loaded into weight register 430 which provides an input to the processor 440. Weights $W_{10}, W_{11}, W_{12}, W_{13}$ may be loaded into weight register 431 which provides an input to processor 441. Weights $W_{20}, W_{21}, W_{22}, W_{23}$ may be loaded into weight register 432 which provides an input to processor 442. Finally, weights $W_{30}, W_{31}, W_{32}, W_{33}$ may be loaded into weight register 433 which provides an input to processor 443.

For at least some embodiments, the plurality of processors 440, 441, 442, 443 operate to perform a SOMAC (Sum-Of-Multiply-Accumulate) instruction, including each of the plurality of processors 440, 441, 442, 443 simultaneously operating to determine an instruction size of the SOMAC instruction, wherein the instruction size indicates a number of iterations that the SOMAC instruction is to be executed and is equal to a number of outputs within a subset ($O_0, O_1, O_2, O_3$) of the output tensor $O_i$. As will be described further, for an embodiment, the instruction size is determined by a macro-instruction iterator of the graph streaming processor, and further it is determined whether the instruction is a Sum-Of-Multiply-Accumulate (SOMAC) instruction.

For at least some embodiments, each of the plurality of processors 440, 441, 442, 443 further simultaneously operate to read a first source operand of a plurality of source operands of the SOMAC instruction from the group load register file 420, wherein the first source operand is one of the subset of inputs ($I_0, I_1, I_2, I_3$) of the input tensor. That is, the first source operand of the SOMAC instruction is one of the subset of inputs $I_0, I_1, I_2,$ or $I_3$ of the input tensor.

For at least some embodiments, each of the plurality of processors 440, 441, 442, 443 further simultaneously operates to read a second source operand of the plurality of source operands of the SOMAC instruction from the weight register file wherein the second source operand is one of the subset of weights of the weight tensor. That is, the second source operand of the SOMAC instruction is one of the subset of weights of the weight tensor $W_{ji}$.

For at least some embodiments, each of the plurality of processors 440, 441, 442, 443 further simultaneously operate to execute multiply and accumulate operations of the SOMAC operation for the number of iterations.

For at least some embodiments, each of the plurality of processors 440, 441, 442, 443 further operate to read a destination operand of the plurality of operands of the SOMAC instruction from one of an output registers 450, 451, 452, 453 wherein the destination operand is one of the subset of the output tensor. Further, each of the plurality of processors 440, 441, 442, 443 further operate to add a sum-of-multiply result to the destination operand, and write a multiply-accumulate result back to the destination operand, wherein the destination operand is a register from the output register file that is an output of the instruction. After this operation, the sum-of-multiply result will be different. If the result would not have been different, then the operation would have been pruned.

For at least some embodiments, a size (number of registers) of the group load register 420 is dependent on a number of inputs within the subset of the input tensor.

For at least some embodiments, a size (number of registers) of the group load register 420 is dependent on a number of threads concurrently running on the plurality of processors.

For at least some embodiments, a size (number of registers) of the output registers 450, 451, 452, 453 is dependent on a number of outputs within the subset of the output tensor.

For at least some embodiments, a size (number of registers) of the output registers 450, 451, 452, 453 is dependent on a number of threads concurrently running on the plurality of processors.

For at least some embodiments, a size (number of registers) of the weight registers 430, 431, 432, 433 is dependent on a number of inputs within the subset of the input tensor.

For at least some embodiments, a size (number of registers) of the weight registers 430, 431, 432, 433 is dependent on a number of outputs within the subset of the output tensor.

For at least some embodiments, a size (number of registers) of the weight registers 430, 431, 432, 433 is dependent on a number of threads concurrently running on the plurality of processors.

Figure 5:
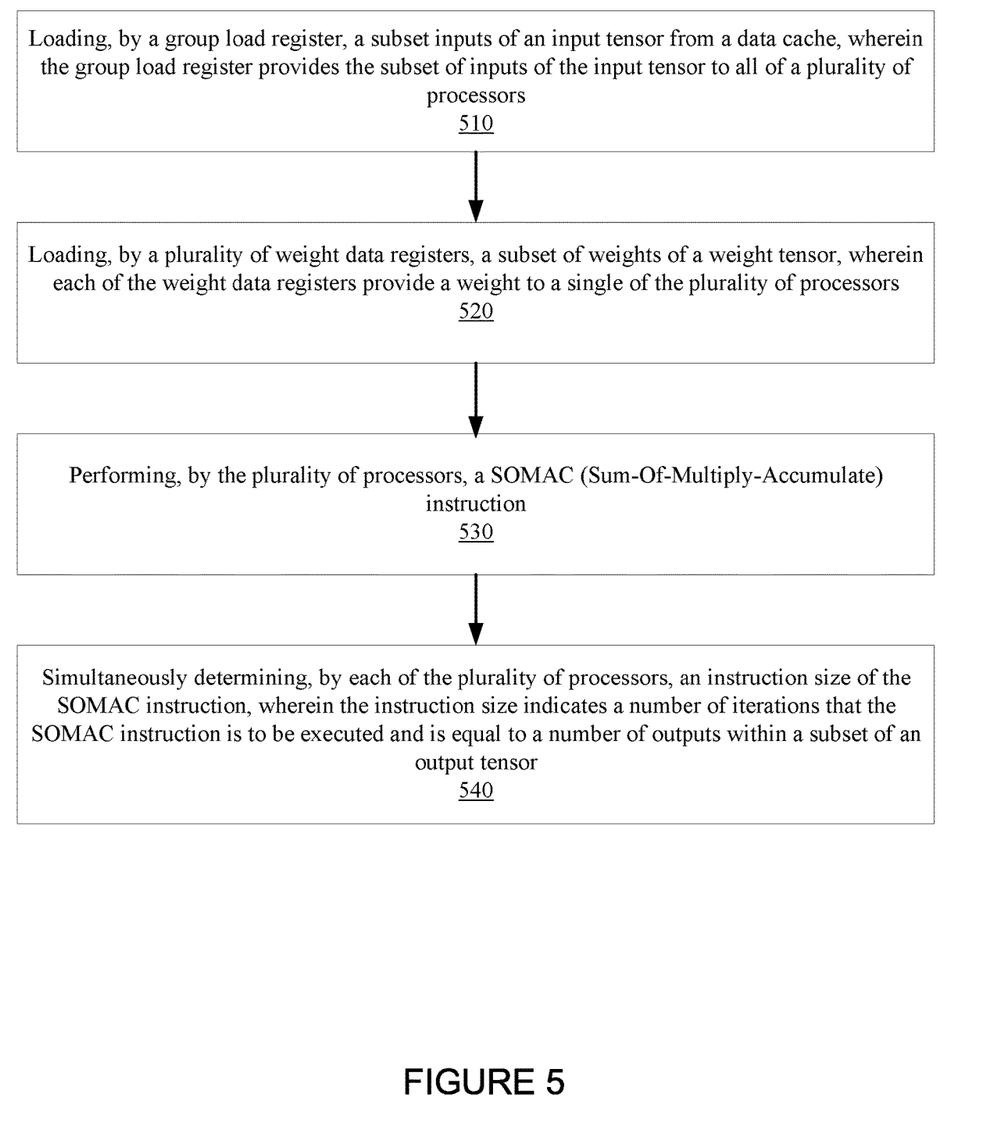
FIG. 5 is a flow chart that includes steps of a method of graph streaming processing that includes a group load register, according to an embodiment.

FIG. 5 is a flow chart that includes steps of a method of graph streaming processing that includes a group load register, according to an embodiment. A first step 510 includes loading, by a group load register, a subset of inputs of the input tensor from a data cache, wherein the group load register provides the subset of the inputs of the input tensor to all of a plurality of processors. A second step 520 includes loading, by a plurality of weight data registers, a subset of weights of the weight tensor, wherein each of the weight data registers provide a weight to a single of the plurality of processors. A third step 530 includes performing, by the plurality of processors, a SOMAC (Sum-Of-Multiply-Accumulate) instruction, including a fourth step 540 that includes simultaneously determining, by each of the plurality of processors, an instruction size of the SOMAC instruction, wherein the instruction size indicates a number of iterations that the SOMAC instruction is to be executed and is equal to a number of outputs within a subset of outputs of an output tensor.

As previously described, at least some embodiments further include reading, by each of the plurality of processors, a first source operand of a plurality of source operands of the SOMAC instruction from the group load register file, wherein the first source operand is one of the subset of inputs of the input tensor.

As previously described, at least some embodiments further include reading, by each of the plurality of processors, a second source operand of the plurality of source operands of the SOMAC instruction from the weight register file wherein the second source operand is one of the subset of the weight tensor.

As previously described, at least some embodiments further include executing, by each of the plurality of processors, multiply and accumulate operations of the SOMAC operation for the number of iterations.

As previously described, at least some embodiments further include reading, by each of the plurality of processors, a destination operand of the plurality of operands of the SOMAC instruction from the output register file wherein the destination operand is one of the subset of the output tensor, adding, by each of the plurality of processors, a sum-of-multiply result to the destination operand, and writing, by each of the plurality of processors, the multiply-accumulate result back to the destination operand, wherein the destination operand is a register from the output register file that is an output of the instruction.

At least some embodiments further include loading, by a second group load register, a second subset of the inputs of the input tensor, wherein the second group load register provides the second subset of inputs of the input tensor to all of a second plurality of processors, loading, by a second plurality of weight registers, a second subset of weights of the weight tensor, wherein each of the second plurality of weight data registers provide a weight to a single of the second plurality of processors, and performing, by the second plurality of processors, the SOMAC (Sum-Of-Multiply-Accumulate) instruction, including each of the second plurality of processors simultaneously determining the instruction size of the SOMAC instruction, wherein the instruction size indicates a number of iterations that the SOMAC instruction is to be executed and is equal to a number of outputs within a second subset of the output tensor.

Figure 6:
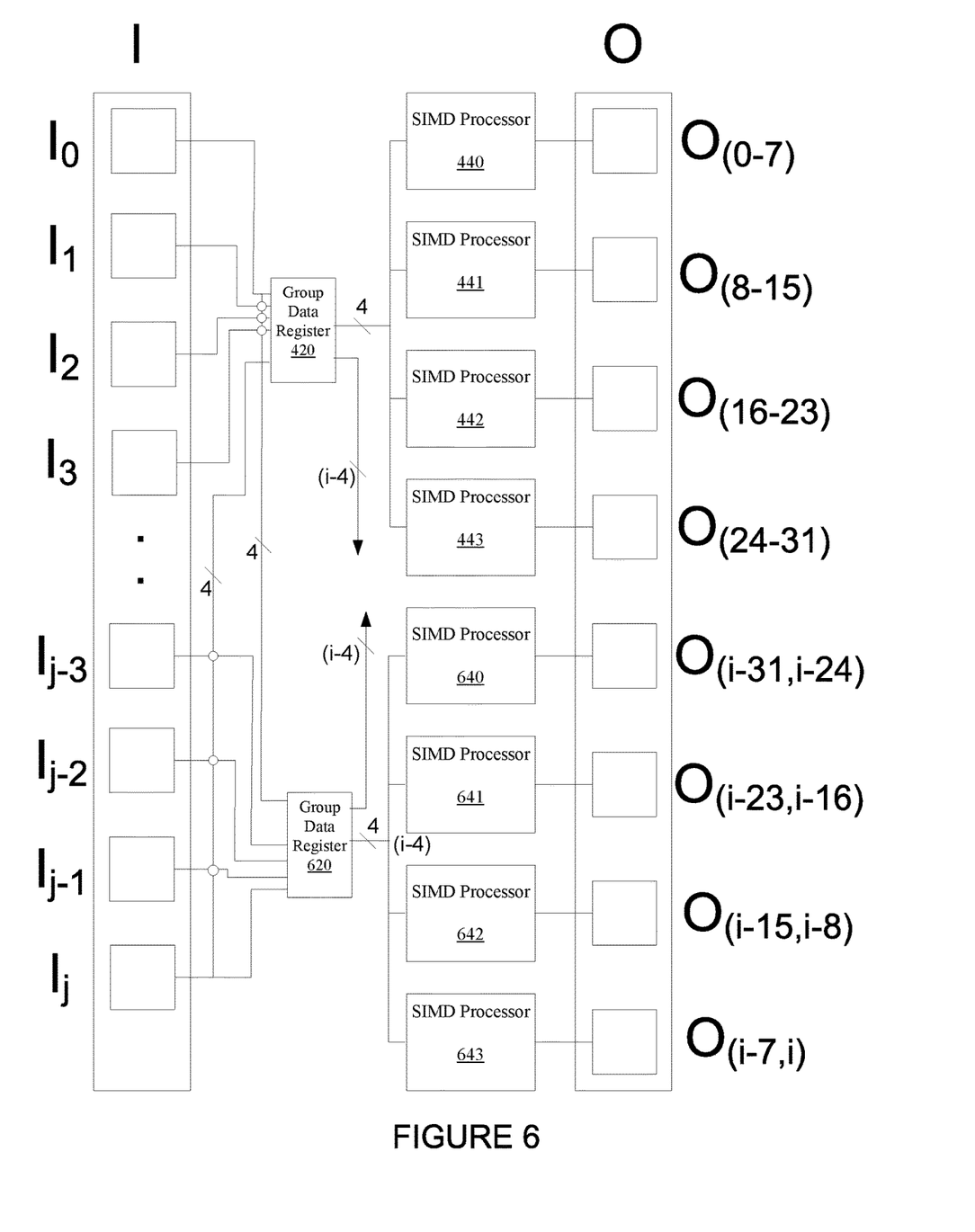
FIG. 6 shows a hardware architecture that provides SIMD (single input, multiple data) processing of an input tensor that includes multiple group load registers, resulting in an output tensor, according to an embodiment.

FIG. 6 shows a hardware architecture that provides SIMD (single input, multiple data) processing of an input tensor that includes multiple group load registers 420, 620, resulting in an output tensor ($O_i$), according to an embodiment. For this embodiment, the graph streaming processor further includes a second plurality of processors 640, 641, 642, 643.

For an embodiment, a second group load register 620 operates to load a second subset of inputs ($I_{j-3}, I_{j-2}, I_{j-2}, I_j$) of the input tensor, wherein the second group load register 620 provides the second subset of inputs ($I_{j-3}, I_{j-2}, I_{j-2}, I_j$) of the input tensor to all of the second plurality of processors 640, 641, 642, 643.

For an embodiment, a second plurality of weight registers (not shown) operate to load a second subset of weights of the weight tensor, wherein each of the second plurality of weight data registers provide a weight to a single of the second plurality of processors 640, 641, 642, 643.

For an embodiment, the second plurality of processors operate to perform the SOMAC (Sum-Of-Multiply-Accumulate) instruction, including each of the second plurality of processors simultaneously operating to determine the instruction size of the SOMAC instruction, wherein the instruction size indicates a number of iterations that the SOMAC instruction is to be executed and is equal to a number of outputs within a second subset of outputs of an output tensor.

At least some embodiments are embodied in methods, apparatuses and systems for reducing operations of Sum-Of-Multiply-Accumulate (SOMAC) instructions.

GSP (Graph Streaming processor) is a multi-threaded, SIMD (single instruction, multiple data) machine with an array of processors. For an embodiment, there exist two compute pipelines in each processor of the GSP which support many data formats such as 8 bit, 16 bit, 32 bit, 64 bit and 128 bit. A SIMD pipeline executes the instructions which operate on multiple data. The scalar pipeline operates on individual data.

Figure 7:
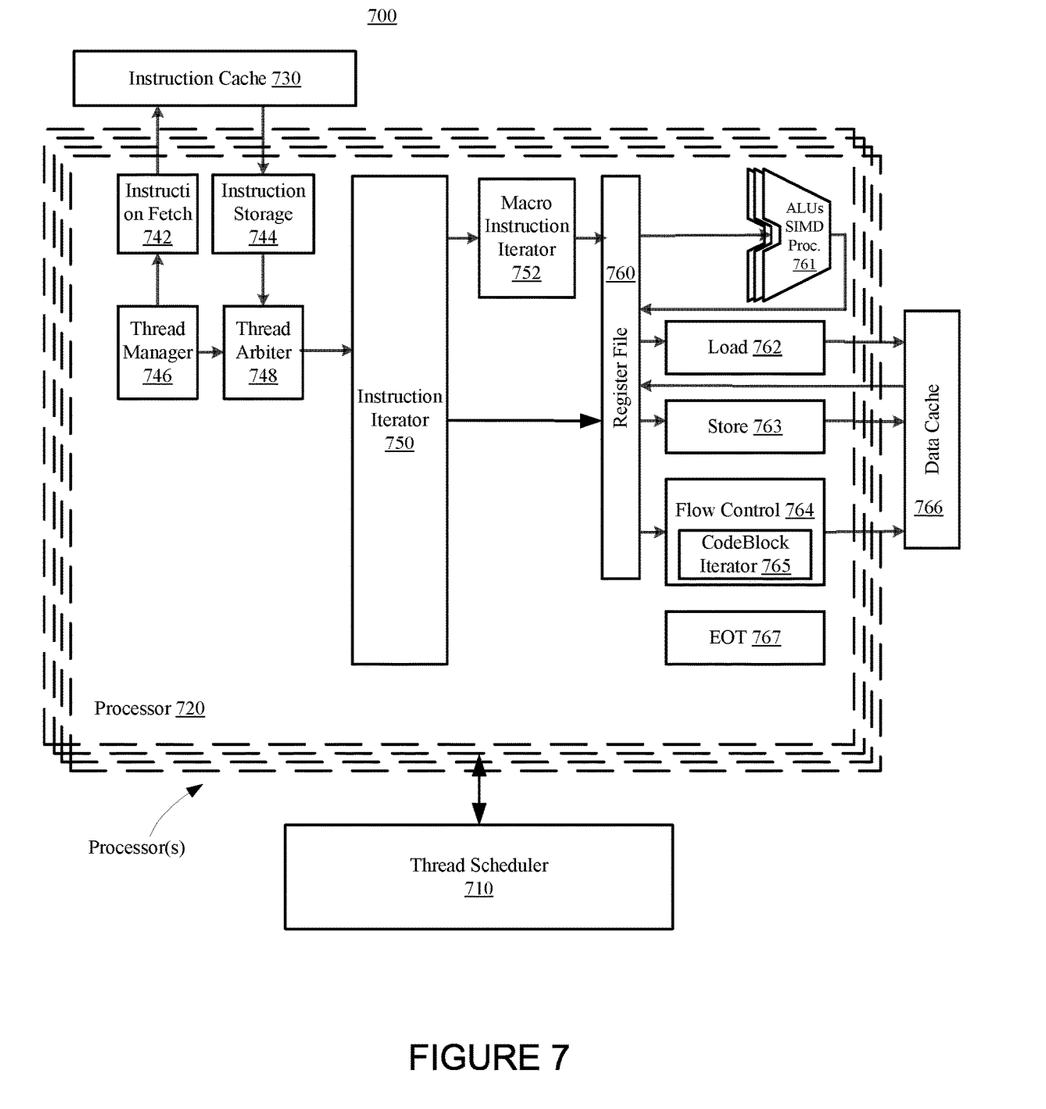
FIG. 7 shows a GSP (Graph Streaming processor), according to an embodiment.

FIG. 7 shows a GSP (Graph Streaming processor) 700, according to an embodiment. For an embodiment, the GSP 700 includes a plurality of processors including a processor 720. Further, the GSP 700 further includes a thread scheduler 710, instruction cache 730, and data cache 766. For at least some embodiments, each of the processors (including processor 720) operates to process a plurality of threads.

For an embodiment, the thread scheduler 710 includes a module that includes a series of identical stages each of which checks on the availability of resources for running a thread (for example, a thread slot, or registers) across an array of processors and dispatches the thread. For at least some embodiments, execution (processing) of an acyclic graph with multiple nodes is carried out by depth-wise mapping of the nodes to the stages. The commands to schedule threads are held in command buffers which are written into by a stage and read from by the next stage, wherein the command buffers are located between the stages.

For an embodiment, the instruction cache 730 includes a read-only cache for servicing the instruction cache-line fetch requests from the threads running on the plurality of processors.

For an embodiment, the data cache includes a read-write cache for servicing the data fetch and write-back requests from the threads running (being processed) on the plurality of processors. Further, at least some embodiments further include a device memory where operating software places all the buffers that are required for execution of the previously mentioned acyclic graph. For an embodiment, these buffers include the command buffers and data buffers.

For at least some embodiments, the processor 720 includes a thread manager 746, an instruction fetch 742, instruction storage 744, and a thread arbiter 748.

For an embodiment, the thread manager 746 includes a module that holds all the states associated with each thread. This includes the initial information at thread dispatch and the state generated during execution of the thread.

For an embodiment, the instruction fetch 742 includes a module that initiates the fetch of a cache-line (for example, 64 Bytes) of instructions from memory via the instruction cache 730.

For an embodiment, the instruction storage 744. For an embodiment, each thread includes 2 cache-line slots that enables the fetch of a second cache-line when a first cache-line is returned by the instruction cache. Thus, the execution of one cache-line worth of instructions overlaps with the fetch of the second cache-line of instructions. For an embodiment, the instruction cache is the instruction cache 730.

For an embodiment, the thread arbiter 748 manages scheduling of instructions into pipelines. For an embodiment, the availability of instructions and the absence of any dependency on prior instructions pending completion of execution make a thread a candidate for scheduling instructions into the different execution pipelines. For an embodiment, the thread arbiter 748 is responsible for fair scheduling of instructions into each of these pipelines.

The processor further includes an instruction iterator 750, and a macro instruction iterator 752. For an embodiment, the instruction iterator 750 includes a module that is responsible for sub-cycling each SIMD instruction for as many phases (iterations) as are required to complete the processing of the instruction. For an embodiment, multiple phases (iterations) are required because of a narrower register file and/or a narrower execution pipeline than an instruction SIMD (single instruction, multiple data) width. That is, data read out of a register file and/or the width of the execution pipeline is less than the instruction SIMD width.

For an embodiment, the macro instruction iterator 752 includes a module that is responsible for handling the SOMAC instructions with an instruction size. The macro instruction iterator 752 controls sequencing of a first source operand read and zero-detection of terms of the first source operand, the second source operand read and izero detection of terms of the second source operand, and the destination operand read and update.

The processor 720 further includes a register file 760. For an embodiment, the register file 760 includes a storage module, and the source and destination operands for each instruction are resident in this storage module. For an embodiment, all operations carried out by the processor 720 reside on registers in the register file. For an embodiment, data can be loaded from memory into the register file and data can be stored to memory from the register file.

For at least some embodiments, the processor 720, which is one of the plurality of processors, includes a plurality of pipelines. For an embodiment, the one of the plurality of processors holds a number of pipelines for performing the various operations needed in the execution of code. These include the math computes, accesses from and to memory, conditional operations and thread termination. There are also multiple instances of these modules based on the throughput requirements for each of the operations.

For at least some embodiments, the pipeline processing includes an ALU (arithmetic logic unit) pipeline, a load pipeline, a store pipeline, a flow control pipeline, and an EOT (end of thread) pipeline.

A plurality of ALUs 761 enables operation of the ALU pipeline. For an embodiment, the ALUs 761 operate to perform math operations including add/subtract/multiply/divide, compares, bit-wise logical operations and data movement.

A load module 762 enables the load pipeline. For an embodiment, the load module 762 performs the issuance of data fetches from memory.

A store module 763 enables the store pipeline. For an embodiment, the store module 763 is used for sending the results in the register file to memory.

A flow control module 764 enables the flow control pipeline. For an embodiment, the flow control module 764 handles all conditional statements including IF/ELSE/ENDIF, WHILE, ENDLOOP, BREAK, and/or CONTINUE.

A code block iterator 765 of the flow control module 764 services WALK/ENDWALK instructions.

An EOT module 767 enables the EOT pipeline. For an embodiment, the EOT module 767 handles a thread termination command and releases all resources occupied by the thread in the processor 720.

Figure 8A:
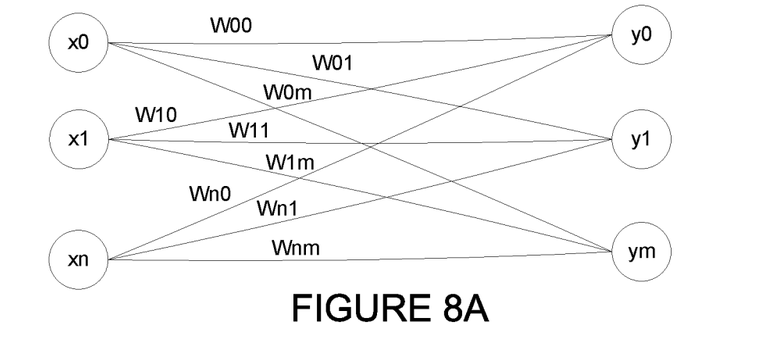
FIG. 8A shows two layers of a neural network wherein each input is connected to and contributes to each output in a weighted process, according to an embodiment.

At least some embodiments of neural networks are made up of a series of layers where each layer has multiple inputs and multiple outputs. Each input and output is a two-dimensional feature map. Each input is connected to and contributes to each output in weighted fashion. FIG. 8A shows two layers of a neural network wherein each input is connected to and contributes to each output in a weighted process, according to an embodiment.

For an the neural newtork processsing includes a compute pipeline having operations which are fundamentally a multiply-accumulate (MAC). A MAC involves multiplying two source operands and accumulating the result into the destination operand.

Figure 8B:
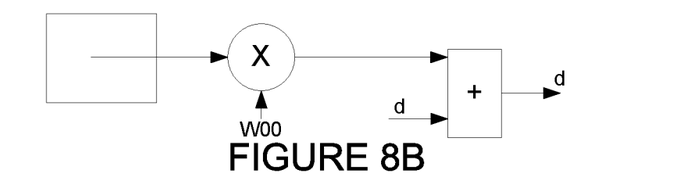
FIG. 8B shows such a MAC operation, according to an embodiment.

FIG. 8B shows such a MAC operation. That is, for example;

$$\text{MAC } d, s0, s1 // d = s0 * s1 + d$$

Figure 8C:
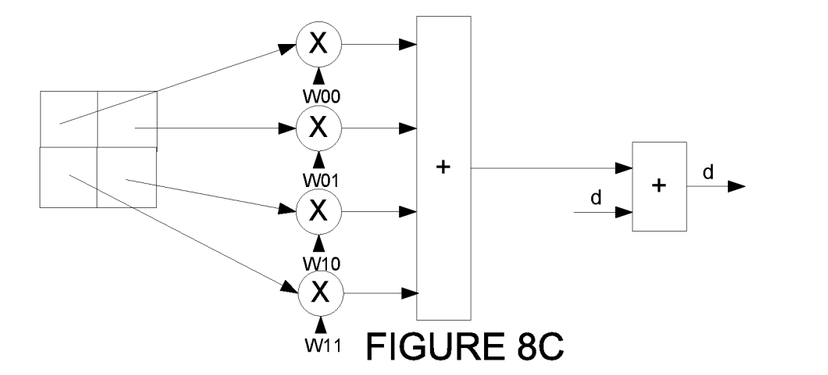
FIG. 8C shows a dot-product-accumulate, according to an embodiment.

FIG. 8C shows an example of a dot-product-accumulate operation which can be referred to as a Sum-Of-Multiply-Accumulate (SOMAC).

Figure 8D:
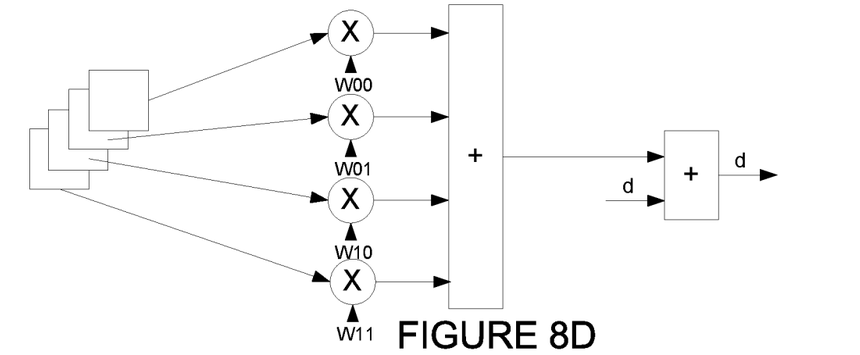
FIG. 8D shows an example of a convolve-accumulate operation, according to an embodiment.

FIG. 8D shows an example of a convolve multiple and accumulate operation which can also be referred to as a Sum-Of-Multiply-Accumulate (SOMAC).

For SOMAC operations, when either s0 or s1 are zero, the compute result is 0 which when accumulated into the destination leaves the destination unchanged. Hence, the operation can be pruned or eliminated.

In neural networks, each of the outputs is generated by performing dot-product-accumulate or convolve-accumulate operations on each of the inputs (s0) against weights (s1). Given the widespread use of these operations, pruning them provides significant benefits.

Figure 9:
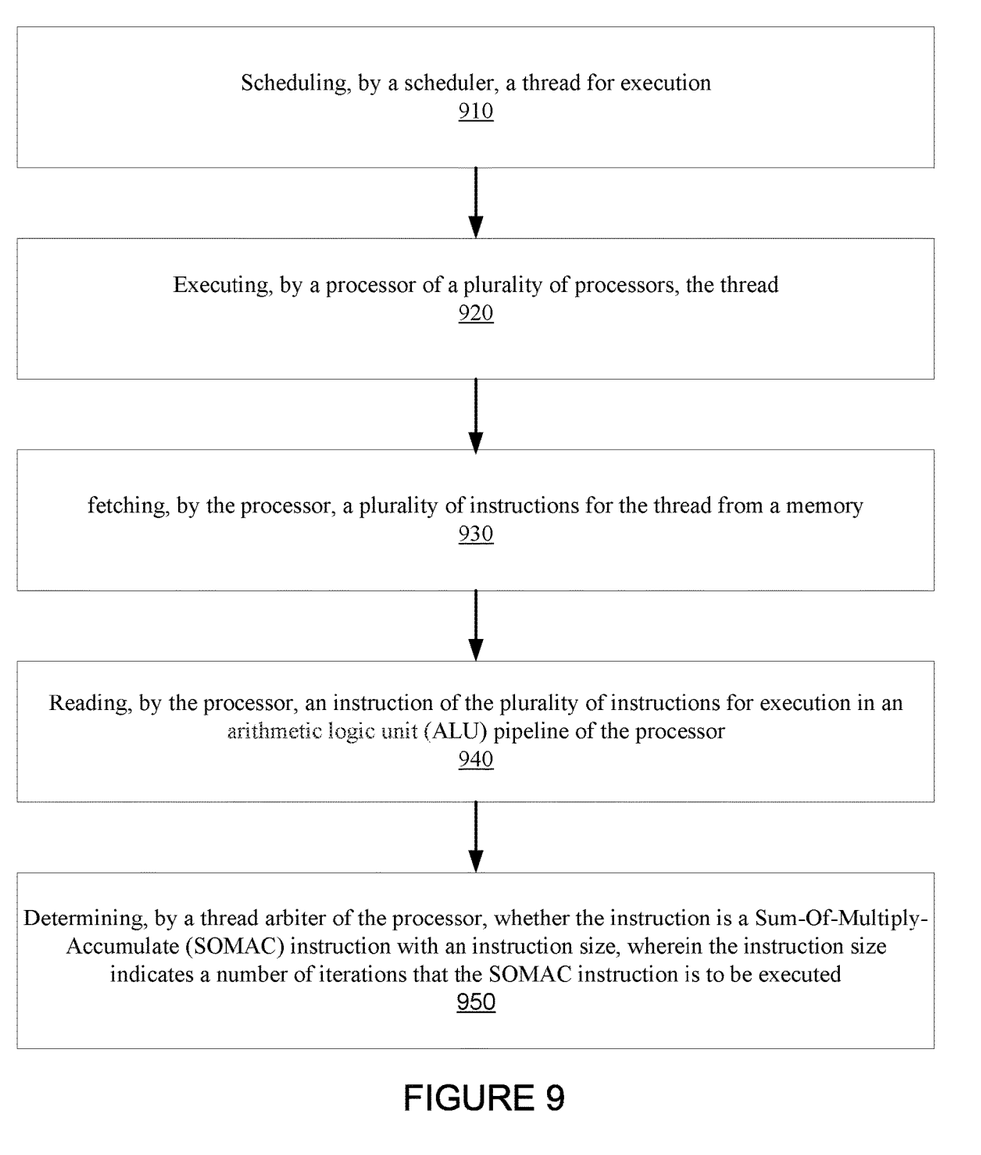
FIG. 9 is a flow chart that includes steps of a method of reducing operations of Sum-Of-Multiply-Accumulate (SOMAC) instructions, according to an embodiment.

FIG. 9 is a flow chart that includes steps of a method of reducing operations of Sum-Of-Multiply-Accumulate (SOMAC) instructions, according to an embodiment. A first step 910 includes scheduling, by a scheduler, a thread for execution. A second step 920 includes executing, by a processor of a plurality of processors, the thread. A third step 930 includes fetching, by the processor, a plurality of instructions for the thread from a memory. A fourth step 940 includes selecting, by a thread arbiter of the processor, an instruction of the plurality of instructions for execution in an arithmetic logic unit (ALU) pipeline of the processor, and reading the instruction. A fifth step 950 includes determining, by a macro-instruction iterator of the processor, whether the instruction is a Sum-Of-Multiply-Accumulate (SOMAC) instruction with an instruction size, wherein the instruction size indicates a number of iterations that the SOMAC instruction is to be executed.

For at least some embodiment, a thread is an instance of a program that is run on a processor. For an embodiment, a thread includes a set of instructions operating on input data and producing output data. The input and output data can be stored within the data cache 166.

As previously described, for an embodiment, a GSP includes a plurality of processors that processes a plurality of threads.

A one of the plurality of processors fetches a plurality of instructions for the thread from a memory. For an embodiment, the memory includes the instruction cache 730.

Further, the processor reads an instruction of the plurality of instructions for execution in an arithmetic logic unit (ALU) pipeline of the processor. The ALU pipeline is operable on one or more of the ALUs 761.

A macro-instruction iterator of the processor determines whether the instruction is a Sum-Of-Multiply-Accumulate (SOMAC) instruction with an instruction size, wherein the instruction size indicates a number of iterations that the SOMAC instruction is to be executed. If the instruction is a Sum-Of-Multiply-Accumulate (SOMAC) instruction, then there may be opportunities to reduce the number of operations of the SOMAC instruction by evaluating terms of operands of the SOMAC instruction.

For an embodiment, the compute pipeline includes operations which are fundamentally a multiply-accumulate (MAC). A MAC involves multiplying two source operands and accumulating the result into the destination operand. For example, a MAC that includes two operands A, B, and a destination operand can be represented as:

$$C = A*B + C - (\text{Multiply-Accumulate MAC}).$$

For at least some embodiments, variations of the MAC operations are used extensively in neural networks, such as, Sum-Of-Multiply-Accumulate (SOMAC) instructions. These include, for example, a dot-product-accumulate operation and a convolve-accumulate operation. For an embodiment, the two source operands and the destination operand need to be read from the register file and fed into the compute pipeline. The operation is performed and the result accumulated into the destination and written back. Such variations (such as, Sum-Of-Multiply-Accumulate (SOMAC) instructions) can be represented by:

$$C = \Sigma A_i * B_i + C - (\text{Sum-Of-Multiply-Accumulate SOMAC}),$$

Multiple iterations of this operation, as determined by the instruction size, can be further represented by a loop as:

For($j=0; j<$instruction size$; j$++)

$C[j] = \Sigma A_i * B_i[j] + C[j]$ (SOMAC in a loop), wherein the first source operand ($A_i$) is common or shared for all iterations.

At least some of the described embodiments reduce the number of operations performed in the execution of the SOMAC instructions. For a SOMAC instruction, the instruction size refers to the number of iterations the SOMAC needs to run for and corresponds to the loop count to generate all the results of the SOMAC operations.

For an embodiment, the processor reads a first source operand of a plurality of source operands of the SOMAC instruction from a register file, wherein the first source operand includes one or more terms and is the input to the SOMAC operation. For an embodiment, each source operand of the plurality of source operands is a register from a corresponding register file that is an input to the instruction. Further, a macro-instruction iterator of the processor determines if all terms of the first source operand are zero. It is to be understood that each operand can be made up of multiple terms, such as, a dot-product-accumulate (DPAC) and convolve-accumulate (CONVAC). Standard MAC operation only includes one term.

For an embodiment, execution of the SOMAC instruction is skipped and a next instruction is read for execution when all terms of the first source operand are zero. For example, in the equations provided above, when all the terms of the operand $A_i$ are zero, then execution of all iterations of the instruction are skipped.

An embodiment includes the thread arbiter of the processor selecting a second instruction of the plurality of instructions for execution in an arithmetic logic unit (ALU) pipeline of the processor, and reading the second instruction, if the first instruction is skipped in an ALU pipeline of the processor. Further the macro-instruction iterator of the processor determines whether the second instruction is a Sum-Of-Multiply-Accumulate (SOMAC) instruction with an instruction size, wherein the instruction size indicates a number of iterations that the SOMAC instruction is to be executed.

For an embodiment, if the instruction is not skipped, the processor reads a second source operand of the plurality of source operands of the SOMAC instruction from the register file when all terms of the first source operand are not zero, wherein the second source operand includes a number of sets of one or more terms, wherein the number of sets is the instruction size. Further, the macro-instruction iterator of the processor determines an instruction mask, wherein the instruction mask includes a plurality of bits, and each bit is determined based on which sets of the number of sets of the second operand have all terms of the set being zero.

For at least some embodiments, each bit of the plurality of bits corresponding to a set of the plurality of sets of the second source operand having all terms of zero are reset (reset to zero), and each bit of the plurality of bits corresponding to a set of the plurality of sets of the second source operand having at least one term non-zero are set (set to one).

For at least some embodiments, the processor executes multiply and accumulate operations of the SOMAC operation for the iterations which are not disabled (mask bit is set)

and skips the iterations which are disabled (mask bit is reset) based on the instruction mask.

For at least some embodiments, the processor reads a destination operand of the plurality of operands of the SOMAC instruction, adds a sum-of-multiply result to the destination operands, and writes the multiply-accumulate result back to the destination operand, wherein the destination operand is a register from the register file that is an output of the instruction. The destination operand is read and updated for each iteration, wherein there is a separate destination operand for each iteration. It is to be understood that, for at least some embodiments, these operations are only performed for the iterations which are not disabled (mask bit is set).

For at least some embodiments, the instruction is one of a plurality of Sum-Of-Multiply-Accumulate (SOMAC) instructions of an implementation of a neural network. For at least some embodiments, each of the plurality of SOMAC instructions includes at least one of a multiply-accumulate operation, a dot product-accumulate operation, or a convolve-accumulate operation. It is to be understood that some other embodiments include other types of SOMAC instructions.

Figure 10:
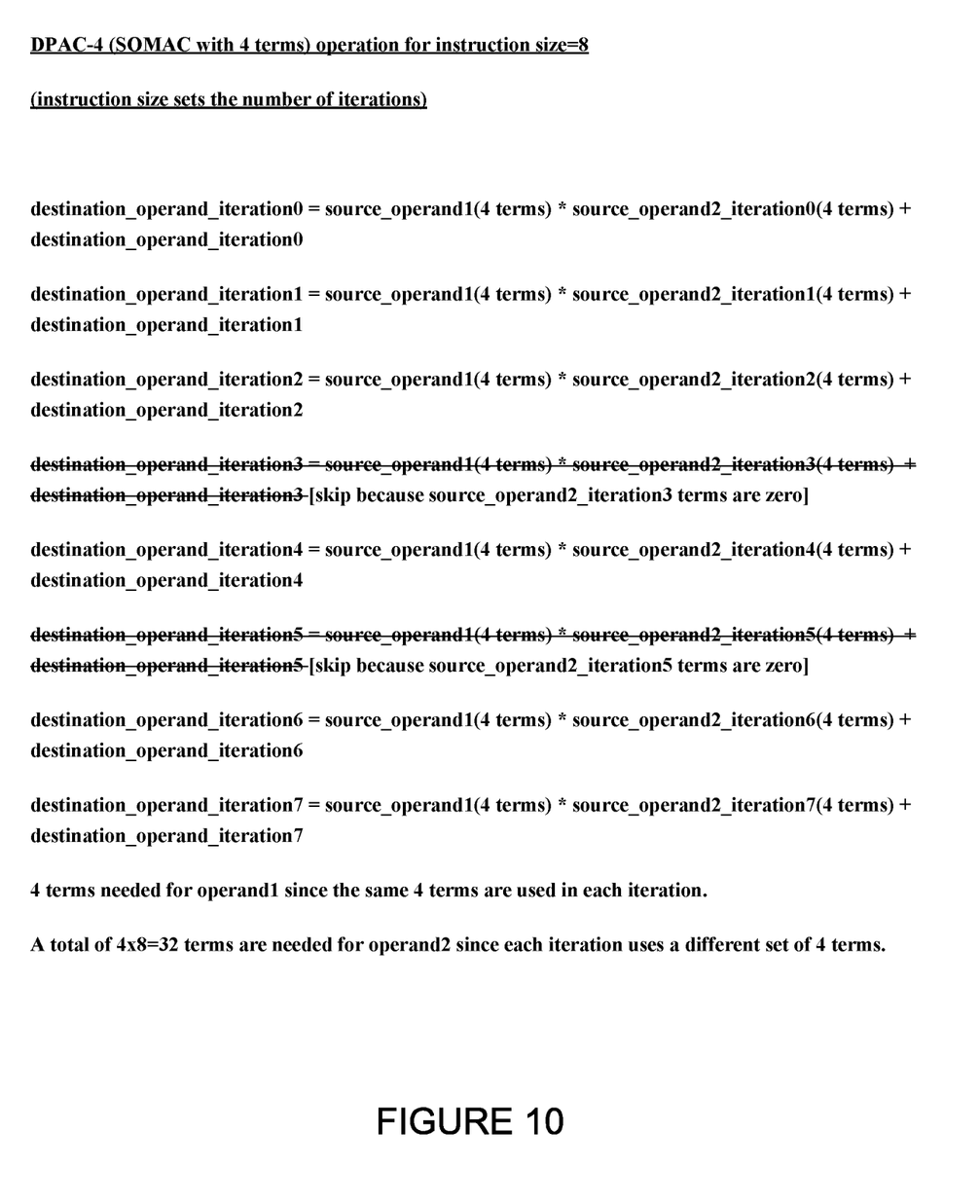
FIG. 10 shows operation of a SOMAC instruction with 4 terms, wherein the instruction size of the SOMAC instruction is 8, and wherein the instruction size sets the number of iterations performed by the SOMAC instruction, according to an embodiment.

FIG. 10 shows operation of a SOMAC instruction with 4 terms (for example, a dot product-accumulate operation with 4 terms), wherein the instruction size of the SOMAC instruction is 8, and wherein the instruction size sets the number of iterations performed by the SOMAC instruction, according to an embodiment. Here, owing to the instruction size of the SOMAC being 8, 8 iterations are to be performed to complete the SOMAC instruction.

As previously described, the macro-instruction iterator of the processor determines whether the instruction is a Sum-Of-Multiply-Accumulate (SOMAC) instruction with an instruction size, wherein the instruction size indicates a number of iterations that the SOMAC instruction is to be executed.

As shown, the first operand (operand1) is multiplied by the 8 different iterations of the second operand (operand2). First, a determination is made whether all of the terms of the first operand are zero. If all of the terms of the first operand are zero, then the entire operation of the current SOMAC instruction can be skipped.

As previously described, the processor reads a first source operand of a plurality of source operands of the SOMAC instruction from a register file, wherein the first source operand includes one or more terms, wherein each source operand of the plurality of source operands is a register from a corresponding register file that is an input to the instruction. Further, a macro-instruction iterator of the processor determines if all terms of the first source operand are zero. In this example, not all the terms of the first source operand are zero.

If all of the terms of the first operand are not zero, then a determination is made on each of the sets of the second source operand. As shown in the figure, only the terms of the fourth and sixth sets are zero, and therefore, the corresponding iterations are skipped.

Although specific embodiments have been described and illustrated, the described embodiments are not to be limited to the specific forms or arrangements of parts so described and illustrated. The embodiments are limited only by the appended claims.

What is claimed:

1. A graph streaming processor, comprising:
   a data cache, the data cache comprising an input tensor, a weight tensor and an output tensor;
   a plurality of processors;
   a group load register operative to load a subset of inputs of the input tensor, wherein the group load register provides the subset of the inputs of the input tensor to all of the plurality of processors, wherein a size of the group load register is dependent on a number of threads concurrently running on the plurality of processors;
   a thread scheduler that includes a module that includes a series of identical stages, wherein each of the identical stages checks on an availability of resources for running a thread of the number of threads across the plurality of processors, and dispatches the thread;
   a plurality of weight data registers operative to load a subset of weights of the weight tensor, wherein each of the plurality of weight data registers provide a weight to a single of the plurality of processors;
   the plurality of processors operative to perform a SOMAC (Sum-Of-Multiply-Accumulate) instruction, including each of the plurality of processors simultaneously operating to:
   determine an instruction size of the SOMAC instruction, wherein the instruction size indicates a number of iterations that the SOMAC instruction is to be executed and is equal to a number of outputs within a subset of a plurality of outputs of the output tensor, wherein each of the number of outputs is generated one at a time.

2. The graph streaming processor of claim 1, wherein each of the plurality of processors further simultaneously operate to:
   read a first source operand of a plurality of source operands of the SOMAC instruction from the group load register, wherein the first source operand is one of the subset of inputs of the input tensor.

3. The graph streaming processor of claim 1, wherein each of the plurality of processors further simultaneously operate to:
   read a second source operand of a plurality of source operands of the SOMAC instruction from a weight register file, wherein the second source operand is one of the subset of weights of the weight tensor.

4. The graph streaming processor of claim 1, wherein each of the plurality of processors further simultaneously operate to:
   execute multiply and accumulate operations of the SOMAC instruction for the number of iterations.

5. The graph streaming processor of claim 4, wherein each of the plurality of processors further simultaneously operate to:
   read a destination operand of a plurality of operands of the SOMAC instruction from one of a plurality of output registers, wherein the destination operand is one of the subset of outputs of the output tensor;
   add a sum-of-multiply result to the destination operand;
   write a multiply-accumulate result back to the destination operand, wherein the destination operand is a register from an output register file that is an output of the SOMAC instruction.

6. The graph streaming processor of claim 1, wherein the graph streaming processor further includes a second plurality of processors, wherein the graph streaming processor further comprises:
   a second group load register operative to load a second subset of the inputs of the input tensor, wherein the second group load register provides the second subset of the inputs of the input tensor to all of the second plurality of processors;

a second plurality of weight data registers operative to load a second subset of weights of the weight tensor, wherein each of the second plurality of weight data registers provide a weight to a single of the second plurality of processors;

wherein the second plurality of processors operate to perform the SOMAC (Sum-Of-Multiply-Accumulate) instruction, including each of the second plurality of processors simultaneously operating to:

determine the instruction size of the SOMAC instruction, wherein the instruction size indicates the number of iterations that the SOMAC instruction is to be executed and is equal to a number of outputs within a second subset of inputs outputs of the output tensor.

7. The graph streaming processor of claim 1, wherein a size of output registers is dependent on a number of outputs within the subset of outputs of the output tensor.

8. The graph streaming processor of claim 1, wherein a size of output registers is dependent on a number of threads concurrently running on the plurality of processors.

9. The graph streaming processor of claim 1, wherein a size of the weight data registers is dependent on a number of inputs within the subset of inputs of the input tensor.

10. The graph streaming processor of claim 1, wherein a size of the weight data registers is dependent on a number of outputs within the subset of outputs of the output tensor.

11. The graph streaming processor of claim 1, wherein a size of the weight data registers is dependent on a number of threads concurrently running on the plurality of processors.

12. A method of graph streaming processing, comprising:
loading, by a group load register, a subset of inputs of an input tensor from a data cache, wherein the group load register provides the subset of inputs of the input tensor to all of a plurality of processors, wherein a size of the group load register is dependent on a number of threads concurrently running on the plurality of processors;
checking, by each of identical stages of a module of a thread scheduler, an availability of resources for running a thread of the number of threads across the plurality of processors, and dispatches the thread;
loading, by a plurality of weight data registers, a subset of weights of a weight tensor, wherein each of the weight data registers provide a weight to a single of the plurality of processors;
performing, by the plurality of processors, a SOMAC (Sum-Of-Multiply-Accumulate) instruction, including:
simultaneously determining, by each of the plurality of processors, an instruction size of the SOMAC instruction, wherein the instruction size indicates a number of iterations that the SOMAC instruction is to be executed and is equal to a number of outputs within a subset of an output tensor, wherein each of the number of outputs is generated one at a time.

13. The method of claim 12, further comprising:
reading, by each of the plurality of processors, a first source operand of a plurality of source operands of the SOMAC instruction from the group load register, wherein the first source operand is one of the subset of inputs of the input tensor.

14. The method of claim 12, further comprising:
reading, by each of the plurality of processors, a second source operand of a plurality of source operands of the SOMAC instruction from a weight_register file, wherein the second source operand is one of the subset of the weights of the weight tensor.

15. The method of claim 12, further comprising:
executing, by each of the plurality of processors, multiply and accumulate operations of the SOMAC instruction for the number iterations.

16. The method of claim 15, further comprising:
reading, by each of the plurality of processors, a destination operand of a plurality of operands of the SOMAC instruction from the output register file, wherein the destination operand is one of the subset of outputs of the output tensor;
adding, by each of the plurality of processors, a sum-of-multiply result to the destination operand;
writing, by each of the plurality of processors, a multiply-accumulate result back to the destination operand, wherein the destination operand is a register from an output register file that is an output of the SOMAC instruction.

17. The method of claim 12, further comprising:
loading, by a second group load register, a second subset of the inputs of the input tensor, wherein the second group load register provides the second subset of the inputs of the input tensor to all of a second plurality of processors;
loading, by a second plurality of weight registers, a second subset of the weights of the weight tensor, wherein each of the second plurality of weight data registers provide a weight to a single of the second plurality of processors; and
performing, by the second plurality of processors, the SOMAC (Sum-Of-Multiply-Accumulate) instruction, including each of the second plurality of processors simultaneously determining the instruction size of the SOMAC instruction, wherein the instruction size indicates the number of iterations that the SOMAC instruction is to be executed and is equal to a number of outputs within a second subset of the output tensor.

* * * * *